Jan. 20, 1959 J. K. MILLS 2,870,332

OSCILLATION GENERATOR

Filed Nov. 15, 1956

INVENTOR
J. K. MILLS
BY W. L. Keefauver
ATTORNEY

United States Patent Office 2,870,332
Patented Jan. 20, 1959

2,870,332

OSCILLATION GENERATOR

John K. Mills, Morristown, N. J., assignor to Bell Telephone Laboratories, Incorporated, New York, N. Y., a corporation of New York Application November 15, 1956, Serial No. 622,471

13 Claims. (Cl. 250—36)

Figure 1:
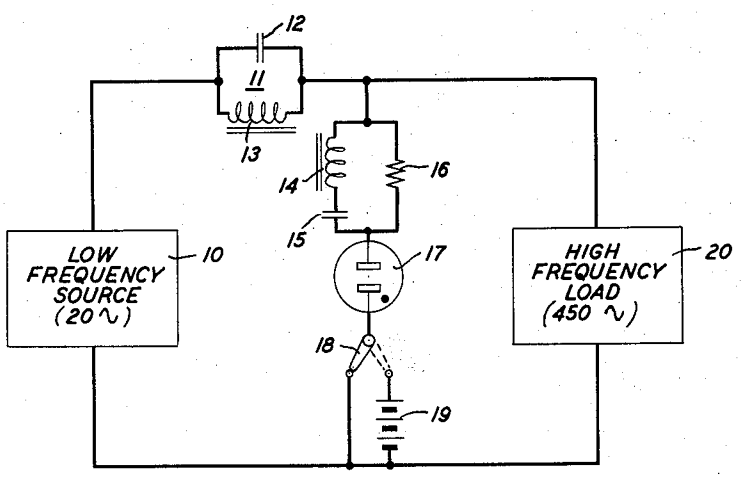

This invention relates to electrical oscillation generators and, more particularly, to electrical circuits for translating a low frequency oscillation, for example, an inaudible signal, into a high frequency oscillation, for example, an audible signal.

It is an object of the present invention to generate a high frequency signal from a power source of relatively low frequency by means of a simple and reliable circuit arrangement.

It is a more specific object of the invention to produce an audible tone of pleasing quality from an inaudible ringing supply source.

These objects are realized in one embodiment of the invention by shock-exciting a resonant circuit a plurality of times each half cycle of the ringing supply source.

In accordance with an illustrative embodiment of the present invention, a symmetrical gas discharge tube is fired by a low frequency power supply through a series combination of an inductor and a capacitor. The series resonant effect of these elements allows only a short pulse of current to pass through, the tube being extinguished due to the back voltage generated in the inductor even while the power supply is still rising. The capacitor of the series circuit is discharged through a shunt resistor of large value, thereby providing a long time constant. When the power supply has risen sufficiently to exceed the sum of the firing potential of the tube and the charge remaining on the capacitor, the tube again fires and is again extinguished after passing a short pulse of current. This process may be continued indefinitely to produce a large number of current pulses each half cycle of the power supply.

The current pulses thus derived are utilized to shock-excite a parallel resonant circuit and thus produce sustained oscillations having a frequency many times that of the power supply. Since the tuned parallel circuit is placed in series with the power supply, the signal resulting is amplitude modulated at a frequency equal to twice the power supply frequency.

The present invention is particularly adapted for producing an audible tone from an inaudible ringing supply for use in a telephone system to indicate that a called subscriber's station is being rung. In this case the frequency of the ringing supply is about 20 cycles per second and the parallel resonant circuit is tuned to a frequency between 400 and 500 cycles per second.

A feature of the present invention resides in the ease with which the number, size and position of the pulses may be controlled, involving only a change in the values of the inductor, capacitor or resistor, thereby changing the shape of the modulation envelope and hence the quality of the sound of the output signal.

A major advantage of the circuit of the present invention over previous audible tone generators is the pleasantness of the tone obtained by multiple pulsing, lacking in the harsh qualities introduced by higher frequency transients in the oscillatory circuit.

These and other objects and features, the nature of the present invention and its various advantages, will appear more fully upon consideration of the accompanying drawings and the following detailed description of these drawings.

In the drawings:

Fig. 1 is a schematic diagram of a circuit incorporating the principles of the invention; and Figs. 2 through 6 represent typical wave forms across various components of the circuit in Fig. 1.

In Fig. 1 an oscillation generating circuit is shown comprising a source 10 of electrical energy having a relatively low frequency such as, for example, a commercial 60 cycle power supply or a 20 cycle ringing supply in a telephone system. Connecting source 10 to a load 20 is a resonant tank circuit 11 comprising a capacitor 12 and an inductor 13 connected in parallel. Connected to tank circuit 11 and across load 20 is a series circuit comprising an inductor 14, a capacitor 15 and a symmetrical gas discharge tube 17. Tube 17, may, for example, be a two element discharge lamp having two symmetrical electrodes such as a neon glow lamp. Such a tube conducts equally well in either direction and has the same firing potential and extinguishing potential for voltages applied to either electrode. Alternatively, tube 17 may be a unilaterally conducting tube of any well-known type, in which case the pulse repetition rate will be only one-half of that provided by a symmetrical tube. It is necessary, however, that this element be of the breakdown variety, that is, the element will not conduct until a certain voltage level is reached and, furthermore, will extinguish at a voltage less than the breakdown voltage. Shunted across inductor 14 and capacitor 15 is a discharging circuit comprising resistor 16. A switch 18 is provided to optionally introduce a direct current voltage source 19 in series with tube 17. Source 19 biases tube 17 to adjust the firing level. Load 20 is adapted to utilize a signal having frequency components many times the frequency of source 10.

The circuit shown in Fig. 1 operates to produce higher frequency components from the low frequency source 10 in the following manner. Tube 17 fires symmetrically, on either polarity, at a first voltage and sustains at a second voltage which is substantially less than the value of the first voltage. Until tube 17 fires, no current flows through it and hence there is no voltage drop across resistor 16, capacitor 15 or inductor 14. When the firing voltage is reached, tube 17 fires, drawing a large semi-sinusoidal current pulse through capacitor 15 and inductor 14 to charge capacitor 15, and a smaller negligible current through resistor 16. For given values of capacitor 15 and inductor 14, the maximum current flow is determined by the difference between the firing and the sustaining voltages of the tube. As capacitor 15 charges, the current through inductor 14 initially rises and then falls, causing a self-induced oscillatory voltage in inductor 14 in opposition to the original voltage impressed by source 10. This voltage across inductor 14 further increases the charge voltage built up across capacitor 15 so that when the voltage across inductor 14 reverses during its oscillatory cycle, the net voltage available at tube 17 is below the minimum sustaining value. Tube 17 then extinguishes despite the fact that the voltage of source 10 is still rising at this instant. After tube 17 is extinguished to open the circuit, capacitor 15 discharges exponentially through resistor 16 and inductor 14 in series. Subsequentially, when the voltage of source 10 has become substantially greater and the voltage across capacitor 15 has dropped somewhat, the tube again fires and is extinguished as before. This process can be repeated a large number of times during each half cycle. The process repeats itself during the opposite half cycle in the same fashion due to the symmetry of tube 17, except that the instantaneous polarities of the voltages and currents are reversed.

The current pulses drawn through tube 17 excite tuned circuit 11, causing it to oscillate at its resonant frequency. Since tuned circuit 11 is excited anew each time tube 17 draws a current pulse, the resulting signal across tuned circuit 11 is of a frequency corresponding to the resonant frequency of circuit 11 and has a modulation envelope more nearly sinusoidal. This signal is added in series with the signal originating at source 10 and is impressed on load 20. The operation of the circuit shown in Fig. 1 may be better understood by considering Figs. 2 through 6.

Figure 2:
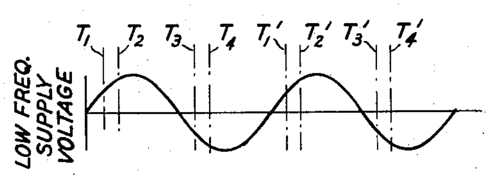
Figure 3:
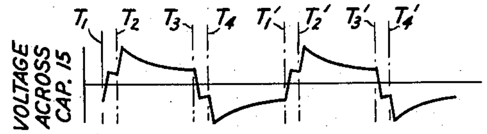
Figure 4:
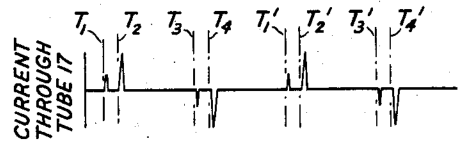
Figure 5:
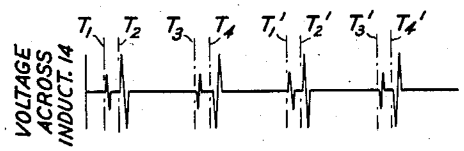
Figure 6:
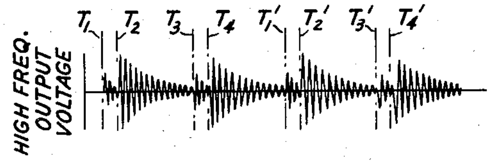

In Fig. 2 is shown, for reference purposes, the wave form of two cycles of the signal provided by source 10. In Fig. 3 is shown, for the purposes of illustration, the voltage across capacitor 15; in Fig. 4 is shown the current through tube 17; in Fig. 5 is shown the voltage across inductor 14; and in Fig. 6 is shown the wave form delivered to load 20. It can be seen from Fig. 2 that at time $T_1$ the voltage has risen sufficiently to provide a voltage across tube 17 equal to its firing potential so that the tube fires. At this point the voltage across capacitor 15 rises rapidly, the current through tube 17 rises and then falls, and the voltage across inductor 14 rises to a maximum, returns to zero and goes to a maximum in the opposite direction. This back voltage across inductor 14 is sufficient to extinguish tube 17 until time $T_2$ when the voltage of source 10 rises sufficiently to exceed the voltage across capacitor 15 and the firing voltage of tube 17. At this point tube 17 again fires, again drawing a semi-sinusoidal pulse of current. These current pulses drawn through tube 17 shock-excite tuned circuit 11 to produce the voltage wave form shown in Fig. 6. This process repeats itself on the negative half cycle at times $T_3$ and $T_4$. While Figs. 2 through 6 show the response of a circuit adjusted to produce two current pulses each half cycle of source 10, any number of such pulses may be obtained by choosing proper circuit constants.

The circuit shown in Fig. 1 is particularly adapted for producing an audible ringing tone from an inaudible ringing supply source of generally about 20 cycles per second in a telephone system transmitting an audible tone to a calling subscriber to indicate that a called subscriber's station is being rung. This audible ringing tone is a voltage generally between 400 and 500 cycles per second modulated at twice the ringing frequency or nominally at 40 cycles per second and usually added in series with the ringing supply voltage. The ringing voltage of itself is totally inaudible in a telephone receiver. It can be seen that for the circuit of Fig. 1 to supply an audible ringing tone, tuned circuit 11 must be tuned to a frequency between 400 and 500 cycles per second. Furthermore, capacitor 15, inductor 14, resistor 16 and tube 17 must be chosen to provide a proper number of pulses each half cycle of the ringing supply source 10 to give a pleasant sounding tone.

A variation in the output presented to load 20 in the circuit in Fig. 1 may be obtained by returning tube 17 to a D. C. bias voltage 19 instead of directly to source 10. By this means the circuit can be made to favor one polarity of the signal source 10 and so produce different forms of modulation in load 20 depending on whether the tube fires a lesser number of times or not at all on the reverse half cycle. The quality of the audible tone can be adjusted in this manner to give the most pleasing results.

Inductor 14 serves to limit the peak current through tube 17 so as to prolong its life. In addition, inductor 14 prevents drawing an abrupt or steeply rising current pulse through the tuned circuit 11 which would induce high frequency transients at the output, causing a harsh sounding tone.

By proper selection of the parameters of tube 17 and circuit constants, tube 17 may be made to fire only once each half cycle or to fire any number of times exceeding once per half cycle. To increase the repetition rate, capacitor 15 or inductor 14, or both, may be made smaller, or the voltage of source 10 may be increased, or the firing potential of tube 17 may be decreased. The width of each current pulse through tube 17 is equal to one cycle at the resonant frequency of capacitor 15 and inductor 14. This current pulse width may, therefore, be adjusted by adjusting the value of these constants. The maximum repetition rate is, of course, determined by the ionization and deionization times of the tube 17. The value of resistor 16 is not critical and may sometimes be omitted. It is of value principally for adjusting the delay between successive pulses and thus insuring that the second current pulse occurs at the proper time to reinforce rather than to cancel the effect of the first current pulse.

It should also be noted that the operation of this circuit in producing two pulses per half cycle of the source 10 is actually improved when the source contains a large odd harmonic content so phased that there is a partial or complete reversal of slope in at least the leading portion of each half cycle. Such harmonic content is typical in sources of the subharmonic generator type. In this case the tube is more readily extinguished between the first and second pulses due to the less rapid increase in the source voltage after the first pulse.

In one embodiment of the present invention, a twenty cycle subharmonic generator was used as the low frequency source and was placed in series with a tank circuit tuned to approximately 450 cycles. A symmetrical gas discharge tube fired twice each half cycle of the source when used in series with a 2.27 henry inductor and a .1 microfad capacitor. This arrangement produced a very pleasing audible tone in a standard telephone receiver.

It is to be understood that the above-described arrangements are merely illustrative of the many possible embodiments representing applications of the principles of the invention. Numerous and varied other arrangements in accordance with these principles can be devised by those skilled in the art without departing from the spirit and scope of the invention.

What is claimed is:

1. In an oscillation generator for producing a signal of a first frequency from a signal of a second frequency substantially less than said first frequency, a source of signals of said second frequency, a tank circuit tuned to said first frequency connected to said source of signals, and a series combination of an inductor, a capacitor and a symmetrical gas discharge tube connected to said tank circuit.

2. In combination, a source of electrical energy having a given frequency, means for utilizing said energy at a frequency substantially greater than said given frequency, frequency translating means connected between said source and said utilizing means, said translating means including a series arm and a shunt arm, a first inductor and a first capacitor connected in parallel in said series arm, and a pulse-generating circuit connected in said shunt arm, said pulse-generating circuit comprising a second inductor, a second capacitor and a symmetrical glow discharge tube connected in a series circuit.

3. The combination according to claim 2 including a resistor connected in shunt across said second inductor and said second capacitor.

4. The combination according to claim 2 including in said series circuit a source of constant potential.

5. A tone generator for producing audible frequency modulation of a sub-audible frequency signal source comprising an oscillatory circuit connected to said sub-audible frequency source and tuned to said audible modulation frequency and means for shock-exciting said oscillatory circuit a plurality of times each half cycle of said sub-audible frequency signal source, said means including a symmetrical voltage breakdown device shunting said subaudible frequency source and an inductor and a capacitor connected in series with said device.

6. The tone generator according to claim 5 in which said means further includes a source of direct current.

7. A pulse-generating circuit for providing a plurality of pulses each half cycle of an alternating current source, said circuit comprising an alternating current source, a gas discharge tube connected in parallel with said alternating current source, an inductor and a capacitor connected in series with such tube and a dissipative discharge circuit connected across said inductor and capacitor.

8. A pulse-generating circuit according to claim 7 further including a source of direct current connected in series with said tube.

9. In combination, a source of electrical oscillations at a first frequency, a load circuit adapted to utilize electrical oscillations at a second frequency at least several times greater than said first frequency, and a frequency translating circuit connected between said source and said load, said translating circuit comprising a series arm and a shunt arm, said series arm comprising a parallel circuit resonant at said second frequency and said shunt arm comprising, in series, an inductor, a capacitor and a gas discharge tube.

10. In combination, a source of alternating voltage, a load circuit for an alternating voltage, and frequency translating means connecting said source and said load circuit, said translating means comprising a series arm and a shunt arm, one end of said series arm being connected to said source and the other end of said series arm being connected to one end of said load, one end of said shunt arm being connected to said other end of said series arm and the other end of said shunt arm being connected to the other end of said load, said series arm comprising an inductor and a capacitor in parallel and said shunt arm comprising an inductor, a capacitor and a gas discharge tube in series.

11. The combination according to claim 10 in which said shunt arm further includes a resistor connected across said inductor and said capacitor.

12. The combination according to claim 10 in which said shunt arm further includes in series with said tube a source of constant potential.

13. In combination, a source of electrical oscillations of a first frequency, means for utilizing electrical oscillations of a second frequency, a parallel resonant circuit tuned to said second frequency connected between said source and said utilizing means, and a pulse generating circuit connected to said resonant circuit, said pulse generating circuit comprising a symmetrical gas discharge tube connected in series with an inductor and a capacitor proportioned to allow said tube to fire twice each positive and negative half cycle, respectively, of said source.

References Cited in the file of this patent

UNITED STATES PATENTS

| | | |
|---|---|---|
| 1,908,249 | Hund | May 9, 1933 |
| 2,017,542 | Langer | Oct. 15, 1935 |
| 2,649,006 | Heytow et al. | Aug. 18, 1953 |
| 2,769,927 | Briggs | Nov. 6, 1956 |